United States Patent [19]

Blakeslee, III

[11] 4,310,484
[45] Jan. 12, 1982

[54] METHOD FOR EXTRUDING MOLTEN NARROW MOLECULAR WEIGHT DISTRIBUTION, LINEAR, ETHYLENE COPOLYMERS

[75] Inventor: Theodore R. Blakeslee, III, Hillsborough, N.J.

[73] Assignee: Union Carbide Corporation, New York, N.Y.

[21] Appl. No.: 174,542

[22] Filed: Aug. 1, 1980

[51] Int. Cl.³ .............................................. B29F 3/06
[52] U.S. Cl. ................................ 264/176 R; 264/349; 366/88; 425/208; 425/376 R; 526/128
[58] Field of Search .......................... 264/176 R, 349; 425/207-209, 376 R; 366/88; 526/128

[56] References Cited

U.S. PATENT DOCUMENTS

| | | | |
|---|---|---|---|
| 2,702,410 | 2/1955 | Brown | 425/208 |
| 3,123,860 | 3/1964 | Vesilind | 425/208 |
| 3,164,375 | 1/1965 | Frenkel | 425/376 R |
| 3,486,192 | 12/1969 | LeRoy | 425/376 R |
| 3,870,284 | 3/1975 | Kruder | 425/208 |
| 4,025,274 | 5/1977 | Uemura et al. | 425/207 |
| 4,107,415 | 8/1978 | Giannini et al. | 526/124 |
| 4,155,655 | 5/1979 | Chiselko et al. | 425/208 |
| 4,173,417 | 11/1979 | Kruder | 366/89 |
| 4,173,445 | 11/1979 | McKelvey et al. | 425/376 A |

*Primary Examiner*—Jeffery R. Thurlow
*Attorney, Agent, or Firm*—Clement J. Vicari

[57] ABSTRACT

A method for extruding granular low density narrow molecular weight distribution linear ethylene polymers which comprises passing said granular polymers into an extrusion apparatus including an extruder screw, said extruder screw having a feed section wherein said polymers are introduced and thence passed through a transition section and a metering section, wherein each lead in the feed section is substantially the same and each lead in the metering section is substantially the same and wherein each lead in the feed section is 5 to 50 percent greater than each lead in the metering section.

10 Claims, 3 Drawing Figures

METHOD FOR EXTRUDING MOLTEN NARROW MOLECULAR WEIGHT DISTRIBUTION, LINEAR, ETHYLENE COPOLYMERS

FIELD OF THE INVENTION

This invention relates to a method for extruding molten narrow molecular weight distribution, linear, ethylene copolymers.

BACKGROUND OF THE INVENTION

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density narrow molecular weight distribution linear ethylene polymers can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. Patent application Ser. No. 892,325 filed Mar. 31, 1979, now abandoned and refiled as Ser. No. 014,414 on Feb. 27, 1979, in the names of F. J. Karol et al. and entitled Preparation of Ethylene Copolymers In Fluid Bed Reactor, and which corresponds to European Patent Application No. 79100953.3 which was published as Publication No. 004,645 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, now abandoned and refiled as Ser. No. 012,720 on Feb. 16, 1979, in the names of G. L. Goeke et al. and entitled Impregnated Polymerization Catalyst, Process For Preparing, and Use For Ethylene Copolymerization, and which corresponds to European Patent Application No. 79100958.2 which was published as Publication No. 004,647 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti containing complex catalyst which is impregnated in a porous inert carrier material.

U.S. patent application Ser. No. 892,037 filed Mar. 31, 1978, now abandoned and refiled as Ser. No. 014,412 on Feb. 27, 1979, in the names of B. E. Wagner et al and entitled Polymerization Catalyst, Process For Preparing And Use For Ethylene Homopolymerization, and which corresponds to European Patent Application No. 79100957.4 which was published as Publication No. 004,646 on Oct. 17, 1979, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of low pressure-low density polyethylene (LP-LDPE) result in a film processing behavior which requires different extrusion parameters. By way of background, conventional extruder screws commonly used for HP-LDPE include an elongated barrel which may be heated or cooled at various locations along its length and a screw which extends longitudinally through the barrel. The screw has a helical land on its surface which cooperates with the cylindrical internal surface of the barrel to define an elongated helical channel. Although the pitch of the screw may vary along the length thereof, it is common at the present time to utilize screws of constant pitch wherein the pitch is "square", that is, where the distance between adjacent flights is equal to the diameter. The screw is rotated about its own axis to work the plastic material and feed it toward the outlet end of the barrel.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the srew. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections an extruder screw also may include a number of other distinct sections. Nearly all screws include, for example so-called "transition" sections.

Over the years there has been a trend toward the use of extruders capable of high outputs. In many applications, various economies in production are possible where high extruder outputs can be obtained on a reliable basis.

Although LP-LDPE resins can be extruded on equipment designed for HP-LDPE resins, such as described above, certain equipment modifications are often required in order to extrude the low pressure resins at optimum conditions and at rates comparable to the high pressure resins. This is particularly true during extrusion of LP-LDPE which is subsequently processed into film. The problem appears to be that when the new granular, low pressure resins are extruded through equipment designed for the earlier high pressure resin pellets, they tend to run at lower throughput rates. When they are pushed to higher rates, the operation becomes unstable. An analysis of the problem revealed that the above deficiencies resulted from starvation, i.e. incomplete filling of the metering section of the extruder screw due to the different solids and melt rheology of the LP-LDPE.

Accordingly, the present methods for extruding LP-LDPE resins are not entirely satisfactory from a practical commercial standpoint and there currently exists a need for providing an extrusion method which provides additional compression (needed with granular materials because of lower bulk densities) without inordinately deepening the feed section and weakening the screw used for extrusion.

SUMMARY OF THE INVENTION

It is the general object of this invention to provide an improved method for dealing with problems of the types mentioned above.

Another object of this invention is to provide a method for achieving good extrudate metering performance at high rates but without irregularities in the consistency of the material being extruded.

These and other objects are achieved by a method for extruding granular low density narrow molecular weight distribution linear ethylene polymers which comprises passing said granular polymers into an extrusion apparatus including an extruder screw, said extruder screw having a feed section wherein said polymers are introduced and thence passed through a transition section and a metering section, wherein each lead in the feed section is substantially the same and each lead in the metering section is substantially the same and wherein each lead in the feed section is 5 to 50 percent greater than each lead in the metering section.

According to the present invention, the lead change between the feed section and metering section is accomplished by an abrupt (in one turn or less) change in the transition section or alternatively at the beginning of the transition section or at the beginning of the metering section.

A more complete understanding of these and other features and advantages of the invention will be gained from a consideration of the following description of certain embodiments illustrated in the accompanying drawings.

DETAILED DESCRIPTION OF THE PREFERRED EMBODIMENTS

Figure 1:
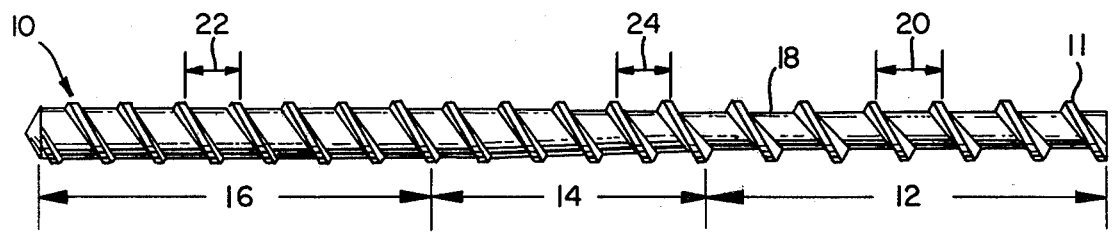
FIG. 1 is an elevational view, of an extruder screw of one embodiment of the present invention wherein the lead change occurs at the beginning of the transition section.
Figure 2:
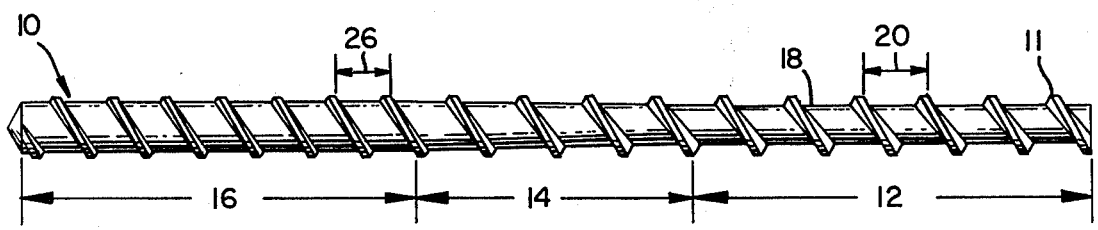
FIG. 2 is a view substantially similar to FIG. 1 showing a second embodiment of the invention in which the lead change between the feed section and metering section is accomplished by an abrupt change at the beginning of the metering section.
Figure 3:
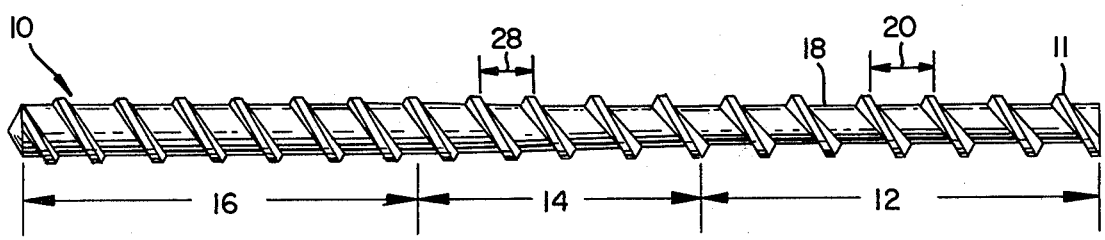
FIG. 3 is a view substantially similar to FIG. 1 showing a third embodiment of the invention in which the lead change between the feed section and metering section is accomplished by an abrupt change in the transition section.

Although FIGS. 1-3 only illustrate an extruder screw for purposes of practicing the method of the present invention, it will be understood that the extruder screw is utilized in its normal environment, i.e. in cooperative association with conventional frame means, a horizontally extending barrel, feed and hopper means and a drive means all of which are not shown since, as mentioned previously, they constitute well-known apparatus commercially available to the art. Merely as illustrative, the extruder screw can be mounted in the apparatus disclosed in U.S. Pat. Nos. 4,155,655 and 4,053,143.

The screw 10, as shown in FIG. 1, is a single stage screw having a helical flight 11 and includes a feed section 12, a transition section 14 and a metering section 16. The feed section 12 receives the granular polymer for plastication and extrusion in the apparatus. In this section the radius of the screw root 18 is smaller than the radius in the transition section and the metering section as shown in the drawings. Thus, the depth of the material channel between the screw root and the inner cylindrical surface of the barrel of the extruder is large. The deep channel depth gives the feed section of the screw a high material delivery rate and causes the particles or pellets of solid polymer to be compacted and compressed. The turning of the screw works the solid bed of plastic to generate heat which serves to melt the solid material.

The feed section 12 is shown at FIG. 1 as having a length of about five times the nominal screw diameter. In this section the depth of the material channel is substantially constant.

Downstream from the feed section 12 is a so-called "transition" section 14 shown in FIG. 1 as having a length of about 4 to 5 times the nominal screw diameter. In this zone the radius of the screw root is gradually increased so that the helical polymer channel becomes progressively narrower. The melting of the material continues as it moves into the transition section 14. This melting takes place for the most part at an interface between a film of molten polymer and a solid bed of packed particle polymers. As the melting continues, however, a point is reached where the solid bed breaks up and small particles of solid polymer become dispersed in the body of a molten polymer.

The final working and pumping of the polymer is achieved in metering section 16 of the screw 10 shown in FIG. 1. This is the section of the screw which is relied upon to deliver high quality polymer melt to the die at a uniform rate. It will be noted that in this section the radius of the screw root remains constant and is greater than the radius of the screw root in the feed section. Moreover it will be further seen that although the metering section has a length of about 8 times the diameter, it can be lesser or greater depending on the total length of the screw.

Under conventional methods for producing HP-LDPE there is generally utilized an extruder screw in which the leads in each section are basically of the same dimension. In the processing of the LP-LDPE granular resins of the instant invention, however, problems occur in the metering section utilizing conventional methods because of the lower bulk densities of the materials. It was found that these problems could be overcome by advancing the lead in the feed section which would thereby provide the additional compression required for processing these unique materials. Hence, referring again to FIG. 1, it will be seen that the lead generally designated by reference numeral 20 in the feed section 12 and which runs from a point on one flight of the screw to a corresponding point on an adjacent flight are substantially of equal dimension throughout the feed section. In the metering section 16, the leads generally designated by reference numeral 22 are also of substantially equal dimension. However, in the feed section 12, the lead is 5 to 50 percent greater, and preferably 15–30 percent greater than the lead in the metering section 16.

As mentioned previously, the lead change between the feed section 12 and the metering section 16 can be accomplished by an abrupt (in one turn, or less) change in the transition section or alternatively at the beginning of the transition section or at the beginning of the metering section.

FIG. 1 shows the abrupt change occurring at the beginning of the transition section by the lead generally designated by reference numeral 24. Referring to FIGS. 2 and 3 wherein like parts are designated by like reference numerals, it will be seen that in FIG. 2 the lead change generally designated by reference numeral 26 occurs at the beginning of the metering section 16 and hence there will be slightly less flights in the transition section. In FIG. 3 the lead change generally designated by reference numeral 28 occurs in the middle of the transition section.

Some exemplary dimensions will serve to further illustrate the nature of the single stage screw used in the invention illustrated in the drawing.

The extrusion screw used in the present invention may have a length to diameter ratio of 15:1 to 30:1 and preferably 17:1 to 25:1. In the feed section 12, the length of the lead, i.e., the distance from 1 point on the flight to the corresponding point on adjacent flight can be 0.8 to 1.5 times the nominal screw outside diameter, preferably 1.05 to 1.4 times the nominal screw outside diameter whereas in the metering section the length of the lead can be 0.7 to 1.4 times the nominal screw outside diameter, preferably 0.9 to 1.1 times the nominal screw outside diameter.

The ethylene polymers which may be used in the process of the present invention are homopolymers of ethylene or copolymers of a major mol percent ($\geq 90\%$) of ethylene, and a minor mol percent ($\leq 10\%$) of one or more $C_3$ to $C_8$ alpha olefins. The $C_3$ to $C_8$ alpha olefins should not contain any branching on any of their carbon atoms which is closer than the fourth carbon atom. The preferred $C_3$ to $C_8$ alpha olefins are propylene, butene-1, pentene-1, hexene-1 and octene-1.

The ethylene polymers have a melt flow ratio of $\geq 18$ to $\leq 32$, and preferably of $\geq 22$ to $\leq 32$. The melt flow ratio value is another means of indicating the molecular weight distribution of a polymer. The melt flow ratio (MFR) range of $\geq 22$ to $\leq 32$ thus corresponds to a Mw/Mn value range of about 2.7 to 4.1. The polymers herein include a Mw/Mn value in the range of about 2.2 to 4.1.

The homopolymers have a density of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, larger molar amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have a relatively low melt index. Ultra-high molecular weight ethylene polymers have a high load (HLMI) melt index of about 0.0 and a very high molecular weight ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 11 to about 950. The melt index of the polymers which are used in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The ethylene polymers of the present invention have an unsaturated group content of $\leq 1$, and usually $\geq 0.1$ 1 to $\leq 0.3$, C=C/1,000 carbon atoms, and a cyclohexane extractables content of less than about 3, and preferably less than about 2, weight percent.

The ethylene polymers of the present invention have a residual catalyst content, in terms of parts per million of titanium metal, of the order of $\leq 20$ parts per million, (ppm) at a productivity level of $\geq 50,000$, and of the order of $\leq 10$ ppm at a productivity level of $\geq 100,000$ and of the order of $\leq 3$ parts per million at a productivity level of $\geq 300,000$. Where the polymers are made with halogen containing catalysts wherein the halogen is chlorine, the polymers have a Cl residue content of $\leq 140$ ppm at a productivity of $\geq 50,000$, a Cl content of $\leq 70$ ppm at a productivity of $\geq 100,000$, and a Cl content $\leq 21$ ppm at a productivity of $\geq 300,000$. The ethylene polymers are readily produced at productivities of up to about 300,000.

The polymers processed in the present invention are produced as granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The polymers of the present invention have a settled bulk density of about 15 to 32 pounds per cubic foot.

The homopolymers and copolymers of the present invention are useful for making film.

For film making purposes the preferred copolymers of the present invention are those having a density of about $\geq 0.917$ to $\leq 0.924$; a molecular weight distribution (Mw/Mn) of $\geq 2.7$ to $\leq 3.6$, and preferably of about $\geq 2.8$ to 3.1; and a standard melt index of $\geq 0.5$ to $\leq 5.0$ and preferably of about $\geq 1.0$ to $\leq 4.0$. The films have a thickness of $>0$ to $\leq 10$ mils and preferably of $>0$ to $\leq 5$ mils.

EXAMPLE 1

An ethylene-butene copolymer which was prepared in accordance with the procedure of U.S. Patent Application Ser. No. 892,325 filed Mar. 31, 1978 now abandoned in the names of F. J. Karol et al. and which is available from Union Carbide Corporation under the tradename designation BAKELITE GRSN 7047 NT was introduced into the feed section of an extruder screw built according to standard industry practice. The copolymer had a density of 0.9185 gm./cc., a melt index of 0.84 gm/10 min., a melt flow ratio of 27.0, a bulk density of 28.3 lb./cu. ft., and an average particle size of 0.0342 inches. The extruder screw had a nominal outside diameter of 2.5 inches. In addition, the screw had the following characteristics:

| | Flighted length 41" | | Flight width .25" | | |
|---|---|---|---|---|---|
| Flight | Lead (inches) | Depth (inches) | Flight | Lead | Depth |
| 1 | 2.5 | .447 | 9 | 2.5 | .153 |
| 2 | 2.5 | .453 | 10 | 2.5 | .152 |
| 3 | 2.5 | .449 | 11 | 2.5 | .153 |
| 4 | 2.5 | .452 | 12 | 2.5 | .151 |
| 5 | 2.5 | .449 | 13 | 2.5 | .151 |
| 6 | 2.5 | .366 | 14 | 2.5 | .151 |
| 7 | 2.5 | .257 | 15 | 2.5 | .150 |
| 8 | 2.5 | .164 | 16 | 2.5 | .151 |

The extruder screw was used in its normal environment, i.e., in cooperative association with conventional frame means, a horizontally extending barrel, feed and hopper means, and a drive means. The screw was run at a speed of 60 rpm in a heated barrel with all zones set at 150° C. Head pressure was set by use of a valve to be approximately 1200 psi. The feed hopper of the extruder was filled to capacity with the resin (i.e., "flood-fed"). In addition, there was attached at the end of the metering zone a conventional mixing head such as disclosed in U.S. Pat. No. 3,486,192. During operation of the extruder screw and at one (1) minute intervals product extrudate was examined and weighed. Fifteen samples were evaluated with the results indicated below.

| | |
|---|---|
| Average sample weight: | 727.6 gms (1.60 lb) |
| Average specific rate: | 1.60 lb/hr/rpm |
| Sample variation: | 10.4% |
| (max. sample weight - min. sample weight)/ | |
| (min. sample weight) | |
| Sample standard deviation: | 19.57 gm (2.69%) |

EXAMPLE 2

An ethylene-butene copolymer which was prepared in accordance with the procedure of U.S. Patent Application Ser. No. 892,325 filed Mar. 31, 1979 now abandoned in the names of F. J. Karol et al. and which is available from Union Carbide Corporation under the tradename designation BAKELITE GRSN 7047 NT and which had an ethylene-to-butene ratio was introduced into the feed section of an extruder screw basically similar to FIG. 1 of the drawing. The copolymer had a density of 0.9185 gm/cc, melt index of 0.84 gm/10 min., a melt flow ratio of 27.0, a bulk density of 28.3 lb./cu.ft., and an average particle size of 0.0342 inches. The extruder screw had a nominal outside diameter of 2.5 inches. In addition, the screw had the following characteristics:

| Flighted length 38.25" | | Flight width .25" |
|---|---|---|
| Flight | Lead | Depth |
| 1 | 3 | .453 |
| 2 | 3 | .460 |
| 3 | 3 | .455 |
| 4 | 3 | .460 |
| 5 | 2½ | .435 |
| 6 | 2½ | .373 |
| 7 | 2½ | .340 |
| 8 | 2½ | .260 |
| 9 | 2½ | .200 |
| 10 | 2½ | .167 |
| 11 | 2½ | .164 |
| 12 | 2½ | .165 |
| 13 | 2½ | .162 |
| 14 | 2½ | .161 |

The extruder screw was used in its normal environment, i.e., in cooperative association with conventional frame means, a horizontally extending barrel, feed and hopper means, and a drive means. The screw was run at a speed of 60 rpm in a heated barrel with all zones set at 150° C. Head pressure was set by use of a valve to be approximately 1200 psi. The feed hopper of the extruder was filled to capacity with the resin (i.e., "flood-fed"). In addition, there was attached at the end of the metering section a conventional mixing head such as disclosed in U.S. Pat. No. 3,486,192. During operation of the extruder screw and at one (1) minute intervals product extrudate was examined and weighed. Fourteen samples were evaluated with the results indicated below.

| | |
|---|---|
| Average sample weight: | 889.7 gms (1.96 lb.) |
| Average specific rate: | 1.96 lb/hr/rpm |
| Sample variation: | 2.4% |
| (max. sample weight - min. sample weight)/ | |
| (min. sample weight) | |
| Sample standard deviation: | 6.47 gm (0.73%) |

As can be seen in Example 1, present technology leads to relatively low output rates with unacceptable levels of variation in rate with time. This level of variation causes commercially unacceptable variations in final product (e.g., regions of thin gauge in film which are too weak). In the extreme, variations of this sort can cause the fabrication system to be sufficiently unstable so as to result in shut-down of the line.

From Example 2, it can be seen that the present invention leads to high output rates (some 22% higher than present technology) with substantial improvements in rate uniformity.

What is claimed is:

1. A method for extruding granular low density narrow molecular weight distribution linear ethylene polymers which comprises passing said granular polymers into an extrusion apparatus including an extruder screw, said extruder screw having a feed section wherein said polymers are introduced and thence passed through a transition section and a metering section, wherein each lead in the feed section is substantially the same and each lead in the metering section is substantially the same and wherein each lead in the feed section is 5 to 50 percent greater than each lead in the metering section.

2. A method according to claim 1 wherein said lead in the feed section is 15–30 percent greater than each lead in the metering section.

3. A method according to claim 1 wherein the lead change between the feed section and the metering section is accomplished by an abrupt change in the transition section.

4. A method according to claim 3 wherein said lead change in the transition section is at the beginning of said transition section.

5. A method according to claim 1 wherein the lead change between the feed section and the metering section is accomplished by an abrupt change at the beginning of the metering section.

6. A method according to claim 1 wherein the depth of the material channel in the metering section is smaller than the depth of the channel in the feed section.

7. A method according to claim 1 in which said polymer is a copolymer of ethylene and at least one $C_3$ to $C_8$ alpha olefin having a melt index of about $\geq 0.1$ to about $\leq 20$.

8. A method according to claim 7 in which said polymer is a copolymer of $\geq 90$ mol percent ethylene and $\leq 10$ mol percent of at least one $C_3$ to $C_8$ alpha olefin.

9. A method according to claim 8 in which said copolymer has a molecular weight distribution of about $\geq 2.7$ to $\leq 6.0$ and a total unsaturation content of about $\geq 0.1$ to $\leq 0.3$ C=C/1000 C atoms.

10. A method according to claim 8 in which said copolymer has a melt flow ratio of about $\geq 22$ to $\leq 40$ and a total unsaturation content of about $\geq 0.1$ to $\leq 0.3$ C=C/1000 C atoms.

* * * * *